United States Patent
Lin et al.

(10) Patent No.: US 11,633,888 B2
(45) Date of Patent: Apr. 25, 2023

(54) METHOD FOR MANUFACTURING A TABLEWARE ARTICLE HAVING A THERMAL-TRANSFER PRINTED PATTERN

(71) Applicant: NAN YA PLASTICS CORPORATION, Taipei (TW)

(72) Inventors: Fong-Chin Lin, Taipei (TW); Tzong-Yang Su, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 415 days.

(21) Appl. No.: 16/298,189

(22) Filed: Mar. 11, 2019

(65) Prior Publication Data

US 2020/0130242 A1    Apr. 30, 2020

(30) Foreign Application Priority Data

Oct. 29, 2018   (TW) .................................. 107138174

(51) Int. Cl.
  *B29C 45/00*  (2006.01)
  *B29C 71/00*  (2006.01)
  (Continued)

(52) U.S. Cl.
  CPC .......... *B29C 45/0053* (2013.01); *B29B 9/06* (2013.01); *B29B 9/12* (2013.01); *B29C 45/0001* (2013.01);
  (Continued)

(58) Field of Classification Search
  CPC .................................................. B41M 5/0052
  See application file for complete search history.

(56) References Cited

U.S. PATENT DOCUMENTS

| | | | |
|---|---|---|---|
| 4,351,758 A | 9/1982 | Lu et al. | |
| 6,572,805 B1 * | 6/2003 | Walter | B29C 45/14688 264/234 |

(Continued)

FOREIGN PATENT DOCUMENTS

| | | |
|---|---|---|
| CN | 105273370 A | 1/2016 |
| CN | 106827849 A | 6/2017 |

(Continued)

OTHER PUBLICATIONS

"Polyethylene Terephthalate." Wikipedia, Wikimedia Foundation, Jun. 7, 2018, web.archive.org/web/20180607155106/en.wikipedia.org/wiki/Polyethylene_terephthalate. (Year: 2018).*

(Continued)

*Primary Examiner* — Kelly M Gambetta
*Assistant Examiner* — Andrés E. Behrens, Jr.
(74) *Attorney, Agent, or Firm* — Li & Cai Intellectual Property (USA) Office

(57) ABSTRACT

A method for manufacturing a tableware article having a thermal-transfer printed pattern includes the following steps. Firstly, a PET resin composition including 3 to 15% by weight of an inorganic filler is provided. Next, the PET resin composition is granulated to obtain plastic granules. Then, the plastic granules are molded into the tableware article and the tableware article is post-crystallized. Finally, a thermal transfer printed pattern is printed on a surface of the post-crystallized tableware article.

5 Claims, 3 Drawing Sheets

(51) Int. Cl.
*B41M 5/00* (2006.01)
*B29B 7/90* (2006.01)
*D06P 5/00* (2006.01)
*C08J 7/00* (2006.01)
*B29B 9/06* (2006.01)
*B29B 9/12* (2006.01)
*B29C 45/72* (2006.01)
*B41M 5/382* (2006.01)
*B29K 67/00* (2006.01)
*B29K 105/00* (2006.01)
*B29K 509/00* (2006.01)
*B29L 7/00* (2006.01)
*B29L 31/00* (2006.01)

(52) U.S. Cl.
CPC ...... *B29C 45/7207* (2013.01); *B29C 71/0063* (2013.01); *B41M 5/0064* (2013.01); *B41M 5/38207* (2013.01); *B29C 2045/0079* (2013.01); *B29C 2795/007* (2013.01); *B29K 2067/00* (2013.01); *B29K 2105/0032* (2013.01); *B29K 2509/00* (2013.01); *B29K 2995/0022* (2013.01); *B29L 2007/002* (2013.01); *B29L 2031/7132* (2013.01); *B29L 2031/7404* (2013.01)

(56) References Cited

U.S. PATENT DOCUMENTS

| | | | | |
|---|---|---|---|---|
| 7,740,784 | B2* | 6/2010 | Tseng | B29C 45/14262 264/513 |
| 9,488,851 | B2* | 11/2016 | Francavilla | G02C 5/008 |
| 10,961,386 | B2* | 3/2021 | Lin | C08J 3/12 |
| 2008/0281051 | A1 | 11/2008 | Boger et al. | |
| 2013/0069274 | A1* | 3/2013 | Zhang | B29C 45/1671 264/279 |
| 2013/0344306 | A1* | 12/2013 | Arai | C09D 11/322 428/207 |

FOREIGN PATENT DOCUMENTS

| | | | | |
|---|---|---|---|---|
| CN | 108384115 A | | 8/2018 | |
| EP | 0046642 A2 * | | 3/1982 | ............. C08K 3/013 |
| EP | 0046642 A2 | | 3/1982 | |
| EP | 0423510 A1 * | | 4/1991 | ............. C08K 3/34 |
| EP | 0423510 A1 | | 4/1991 | |
| JP | 2004136510 A | | 5/2004 | |
| JP | 2004300432 A | | 10/2004 | |
| JP | 3628937 B2 * | | 3/2005 | |
| JP | 200750265 A | | 3/2007 | |
| JP | 2008037038 A * | | 2/2008 | |
| JP | 2010150484 A | | 7/2010 | |
| JP | 2013111972 A | | 6/2013 | |
| TW | M544258 U | | 7/2017 | |
| TW | 201833219 A | | 9/2018 | |

OTHER PUBLICATIONS

Sep. 12 Sep. 2016, www.kreyenborg.com/en/infrarot-vortrocknung-von-pet-flakes-leistungssteigerung-und-qualitaetsverbesserung-bei-entgasungsextrudern/#:-:text-Infrared%20drying%20allows%20increasing%20the,period%20of%20roughly%2015%20minutes. (Year: 2016).*

JP3628937B2 (Masaki) May 2000 (online machine translation), [Retrieved on Apr. 13, 2021]. Retrieved from: Espacenet (Year: 2000).*

Kent, Robin John. Energy Management in Plastics Processing: Strategies, Targets, Techniques, and Tools. Elsevier, Ch. 4 Summary, Jun. 21, 2018. (Year: 2018).*

Dr. Kopeliovich, Dmitri. "Materials Engineering." Annealing of Plastics [SubsTech], Aug. 1, 2013, www.substech.com/dokuwiki/doku.php?id=annealing_of_plastics. (Year: 2013).*

Sawgrass. "Sublimation Success Guide: The Complete Guide to Successful Dye Sublimation and Printing." Serigraphie Boutique, Mar. 2014, www.serigraphie-boutique.fr/WebRoot/Store/Shops/54456119/6005/63A2/995C/99E0/E9EC/596E/87DC/98BD/sawgrass_sublimation_guide.pdf. (Year: 2014).*

JP-2008037038-A (ABE) Feb. 2008 (online machine translation), [Retrieved on Aug. 17, 2022]. Retrieved from: Google (Year: 2008).*

Pecorini, T. J., and R. W. Hertzberg. "The Fracture Toughness and Fatigue Crack Propagation Behaviour of Annealed PET." Polymer, vol. 34, No. 24, Elsevier BV, Dec. 1993, pp. 5053-5062. https://doi.org/10.1016/0032-3861(93)90248-9. (Year: 1993).*

* cited by examiner

METHOD FOR MANUFACTURING A TABLEWARE ARTICLE HAVING A THERMAL-TRANSFER PRINTED PATTERN

CROSS-REFERENCE TO RELATED PATENT APPLICATION

This application claims the benefit of priority to Taiwan Patent Application No. 107138174, filed on Oct. 29, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for manufacturing a tableware article, and more particularly to a method for manufacturing a tableware article having a thermal-transfer printed pattern.

BACKGROUND OF THE DISCLOSURE

Ceramic tableware are popular among people owing to their variety of shapes, bright colors, cool and smooth tactile sensation and easy washing. However, ceramic tableware are easily broken upon impact or when dropped. In addition, ceramic tableware require a production process with more complicated techniques and high energy consumption. Nowadays, the use of ceramic-like tableware has become more and more popular.

Melamine is commonly used in ceramic-like tableware. Melamine tableware is cheap and shatterproof so that many stores prefer its use for serving food. However, melamine tableware may release melamine at around 30° C. to 40° C., and thus, for people who regularly eat out, eating with melamine tableware is comparable to taking chronic disease drugs. The long-term accumulation of melamine may seriously damage the kidneys.

Polybutylene terephthalate (PET) is a safe food grade plastic with high-temperature resistance and is able to be recycled and reused. PET is commonly used in the manufacture of tableware. However, PET products not only have a poor surface gloss inferior to ceramic products, but are also difficult to print patterns or textures thereon, or otherwise the printed patterns or textures may be defective.

Therefore, a novel method is required to improve the aesthetics of PET tableware and increase the market acceptance of PET tableware.

SUMMARY OF THE DISCLOSURE

In response to the above-referenced technical inadequacies, the present disclosure provides a method for manufacturing a tableware article having a thermal-transfer printed pattern. Tableware manufactured by the method take aesthetics and food safety into consideration and can replace melamine tableware commonly used by the public.

In one aspect, the present disclosure provides a method for manufacturing a tableware article having a thermal-transfer printed pattern, including: providing a PET resin composition including 3 to 15% by weight of an inorganic filler; granulating the PET resin composition to obtain plastic granules; molding the plastic granules into the tableware article and post-crystallizing the tableware article; and forming the thermal transfer printed pattern on a surface of the post-crystallized tableware article.

In certain embodiments, the inorganic filler is barium sulfate.

In certain embodiments, in the step of granulating the PET resin composition, the PET resin composition is added to a twin-screw extruder and melted at a temperature between 250° C. and 280° C. for granulation.

In certain embodiments, the step of post-crystallizing the tableware article includes heat-treating the tableware article at a temperature between 150° C. and 200° C.

In certain embodiments, the tableware article is heat-treated for a period of time between 10 minutes and 30 minutes.

In certain embodiments, the heat treatment temperature is higher than or equal to a temperature for forming the thermal transfer printed pattern.

In certain embodiments, the step of post-crystallizing the tableware article irradiating the tableware article with infra-red rays.

In certain embodiments, the tableware article is irradiated for a period of time between 10 minutes and 20 minutes.

In certain embodiments, in the step of forming the thermal transfer printed pattern, the tableware article is subjected to thermal transfer under a vacuum environment with a pressure between 150 torr and 760 torr and a temperature between 150° C. and 200° C.

In certain embodiments, the PET resin composition further includes 1 to 10% by weight of at least one additive selected from one or a combination of two of a lubricant, an antioxidant, a stabilizer, and a coloring agent.

One of the advantages of the present disclosure is that the method of the present disclosure can improve the surface smoothness and temperature resistance of the tableware article by including steps of: granulating a specific PET resin composition to obtain plastic granules and molding the plastic granules into a tableware article, and subsequently post-crystallizing the tableware article. Therefore, a high-quality thermal transfer printed pattern, which is intact and clear, can be formed on the tableware article.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
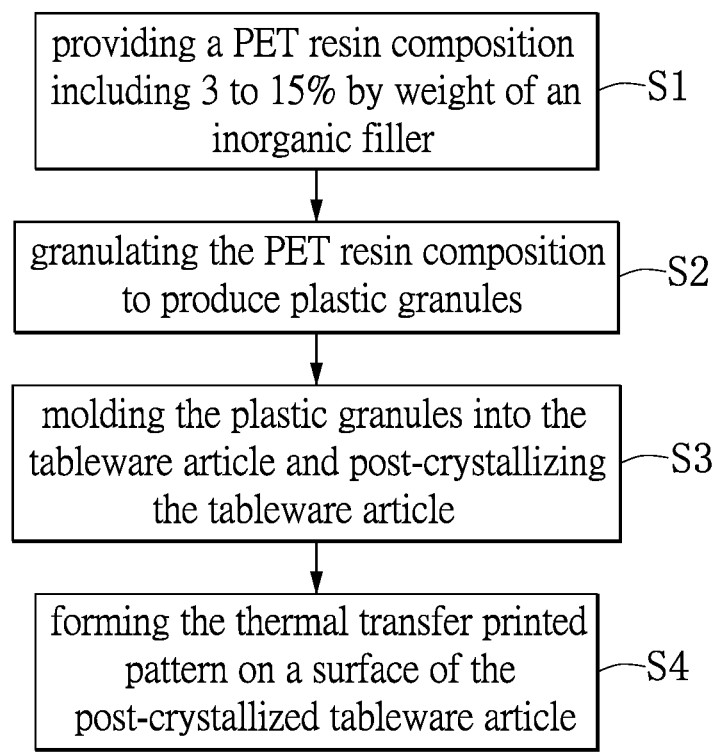
FIG. 1 is a flowchart of a method for manufacturing a tableware article having a thermal-transfer printed pattern.

Melamine tableware (i.e., tableware made of melamine-formaldehyde resin) may cause excessive migration of melamine and formaldehyde to foods, which may do harm to human health. PET (polyethylene terephthalate) is a non-toxic plastic with good hardness and toughness, light weight, and high acid/alkali resistance, and PET containers are widely used in packaging for water and beverages. Therefore, the present disclosure provides a method for the manufacture of tableware using a PET resin composition. PET tableware obtained (such as a bowl or a dish) have both a ceramic-like glossy appearance and a high-quality thermal transfer printed pattern.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1, the present disclosure provides a method for manufacturing a tableware article having a thermal-transfer printed pattern, including: step S1, providing a PET resin composition including 3 to 15% by weight of an inorganic filler; step S2, granulating the PET resin composition to obtain plastic granules; step S3, molding the plastic granules into the tableware article and post-crystallizing the tableware article; and step S4, forming the thermal transfer printed pattern on a surface of the post-crystallized tableware article.

In the step S1, the PET resin composition mainly includes a PET resin and an organic filler, wherein the content of the PET resin can be from 75% by weight to 90% by weight. The organic filler is added to increase the surface gloss of the article made from the PET resin composition. Furthermore, the organic filler also helps to improve the mechanical properties of the product, for example, increases the tensile strength, shear strength, impact resistance and hardness of the product. The inorganic filler can be barium sulfate ($BaSO_4$), talc or a combination thereof, preferably barium sulfate.

The ingredients of the PET resin composition can be uniformly-mixed by a conventional mixing device. Without affecting the expected effects of the present disclosure, the PET resin composition may optionally include at least one additive of a lubricant, an antioxidant, a stabilizer, and a coloring agent, but is not limited thereto. The content of the additive(s) can be from 1% by weight to 10% by weight. Specific examples of the lubricant include EBS (ethylene bis stearamide), erucamide, polyethylene wax, paraffin wax, stearic acid, zinc stearate, and calcium stearate. Specific examples of the antioxidant include hindered phenol-based antioxidants, hindered amine-based antioxidants, phosphite-based antioxidants, and thioether-based antioxidants. The stabilizer can be a heat stabilizer and a light stabilizer. The coloring agent can be any suitable colorant (e.g., titanium dioxide).

The hindered phenol-based antioxidant maybe n-octadecyl-3-(3',5'-di-tert-butyl-4'-hydroxyphenyl)propionate, n-octadecyl-3-(3'-Methyl-5'-tert-butyl-4'-hydroxyphenyl) propionate, n-tetradecyl-3-(3',5'-di-tert-butyl-4'-hydroxyphenyl)propionate, 1,6-hexanediol-bis[3-(3,5-di-tert-butyl-4-hydroxyphenyl)propionate], 1,4-butanediol-bis[3-(3,5-di-tert-butyl-4-hydroxyphenyl)propionate], 2,2'-methylene-bis(4-methyl-tert-Butylphenol), triethylene glycol-bis[3-(3-tert-butyl-5-methyl-4-hydroxyphenyl)propionate], tetra-[methylene-3-(3',5'-di-tert-butyl-4-hydroxyphenyl) propionate]methane, 3,9-bis[2-{3-(3-tert-butyl-4-hydroxy-5-methylphenyl) propionyloxy}-1,1-dimethylethyl]2,4,8,10-tetraoxaspiro(5,5)undecane, and etc.

The hindered amine-based antioxidant may be N,N'-bis-3-(3',5'-di-tert-butyl-4'-hydroxyphenyl)propenyl hexamethylenediamine, N,N'-tetramethylene-bis[3-(3'-methyl-5'-tert-butyl-4'-hydroxyphenyl)propanyl]diamine, N,N'-bis[3-(3,5-di-t-butyl-4-hydroxyphenyl)-propenyl] hydrazine, N-salicylidene-N'-salicylidene hydrazine, 3-(N-salicylidene) Amino-1,2,4-triazole, N,N'-bis[2-{3-(3,5-di-tert-butyl-4-hydroxyphenyl) propionyloxy}ethyl]poxyamide. The hindered amine-based antioxidant is preferably triethylene glycol-bis[3-(3-tert-butyl-5-methyl-4-hydroxyphenyl) propionate] or hydrazine [methylene-3-(3',5'-di-tert-butyl-4-hydroxyphenyl)propionate] methane.

The phosphite-based antioxidant is preferably one in which at least one PO bond is bonded to the aromatic group, and examples thereof include tri(2,6-di-tert-butylphenyl) phosphite, tetra(2,6-di-tert-butylphenyl)4,4'-diphenyl phosphite, bis(2,6-di-tert-butyl-4-methylphenyl)pentaerythritol-diphosphite, 2,2-methylenebis(4,6-di-t-butylphenyl) octylphosphite, 4,4'-butylene-bis(3-methyl-6-tert-butylphenyl-di-tridecyl)phosphite, 1,1,3-tri(2-methyl-4-di-tridecyl)phosphite-5-tert-butylphenyl)butane, tri(mixed mono- and di-nonylphenyl) phosphite, tri(hexamethylene-phenyl)phosphite, 4,4'-isopropylidene bis(phenyl-dialkyl phosphite), and etc.

In the step S2, the PET resin composition can be melted and kneaded in a twin screw extruder, with the process temperature set between 250° C. and 280° C., and the screw speed is set between 250 rpm and 290 rpm. After that, an extruded strip from the discharge port of the twin-screw extruder is cooled and subsequently shredded into plastic granules. The plastic granules may have an average size from 2 mm to 4 mm, but is not limited thereto.

In other embodiments, before conducting the step S2, the PET resin composition can be melted and kneaded by a kneading device. The kneading device can be a general mixing tank, a kneading tank, a single-shaft or multi-shaft kneading device (e.g., kneading machine), but is not limited thereto. The kneading time may be from 1 minute to 2 hours depending on the device used for the PET resin composition and its operation conditions (e.g., temperature).

Figure 2:
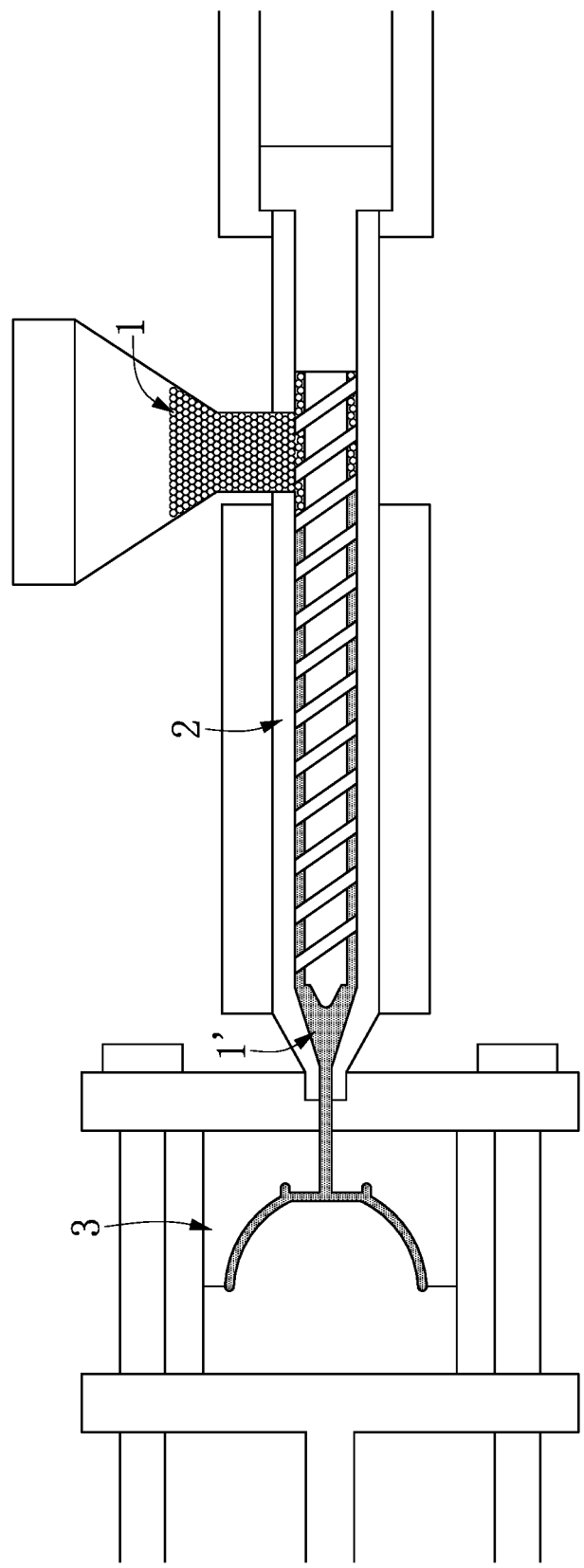
FIG. 2 is a schematic view showing a step of molding plastic granules into the tableware article of the method of the present disclosure.

In the step S3, as shown in FIG. 2, the plastic granules 1 can be added into a hot runner 2 to be melted into a molten plastic material 1'. Next, the molten plastic material 1' is filled in a shaping mold 3 and is then cured to form a tableware article 4 after cooling. After that, a post-crystallization treatment is performed on the tableware article 4 to obtain a post-crystallized tableware article 4. It should be noted that, in the process of post-crystallization, the secondary crystallization of crystalline polymers in the tableware article 4 can be accelerated, so as to orient molecular chains to the crystal direction for improving the crystallinity. Therefore, the crystal structure of the tableware article 4 is more complete, so that the temperature resistance and mechanical properties of the tableware article 4 can be improved and the internal stress of the article 4 can be reduced.

In the present embodiment, the plastic granules 1 can be melted at a temperature between 250° C. and 280° C. The post-crystallization of the tableware article 4 can be implemented by subjecting the tableware article to the heat treatment at a temperature between 150° C. and 200° C. for a period of time between 10 minutes and 30 minutes. The post-crystallization of the tableware article can also be implemented by the tableware article 4 being irradiated with infrared rays for a period of time between 10 minutes and 20 minutes.

Figure 3:
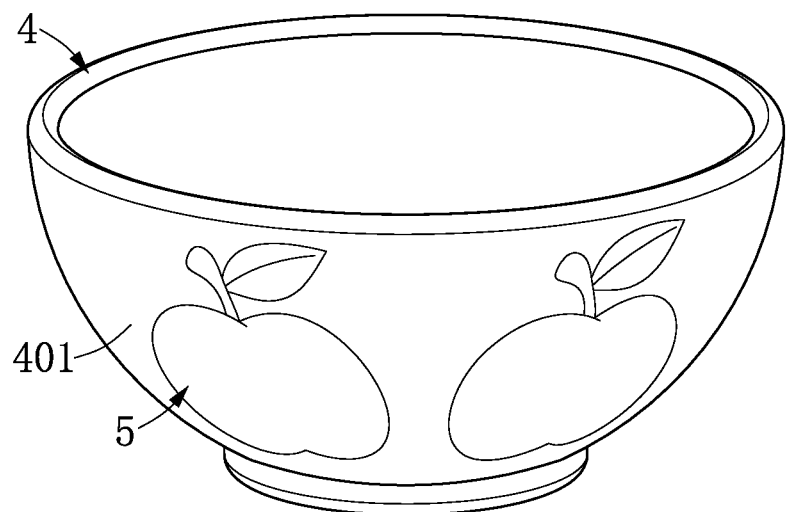
FIG. 3 is a schematic view showing the tableware article manufactured by the method of the present disclosure.
Figure 4:
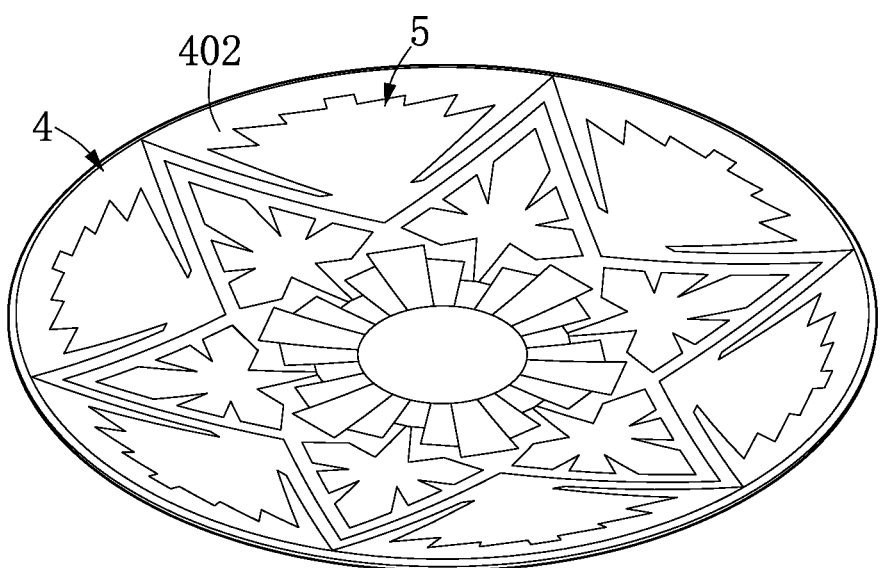
FIG. 4 is another schematic view showing the tableware article manufactured by the method of the present disclosure.

In the step S4, in the thermal transfer printing process, the tableware article 4 can be subjected to thermal transfer under a vacuum environment with a pressure between 150 torr and 760 torr and a temperature between 150° C. and 200° C. In the present embodiment, the heat treatment temperature for post-crystallizing the tableware article 4 is higher than or equal to a temperature forming the thermal transfer printed pattern. As shown in FIG. 3, the tableware article 4 can be a bowl that has a thermal transfer printed pattern 5 on an external surface 401 thereof. As shown in FIG. 4, the tableware article 4 can be a dish that has a thermal transfer printed pattern 5 on an internal surface 402 thereof. However, the above-mentioned examples disclosed herein are not intended to limit the present disclosure. It should be noted that, the post-crystallized tableware article 4 can be resistant to a certain degree of high temperatures, and the external surface 401 or the internal surface 402 thereof is relatively smooth. Therefore, a high-quality thermal transfer printed pattern 5, which is complete and clear, can be formed on the post-crystallized tableware article 4.

Experimental examples 1-3 and specific comparative examples of manufacturing methods of a tableware article having a thermal transfer printed pattern are shown in Table 1, wherein experimental examples 1-3 use different compositions. The evaluation results of mechanical properties of the tableware products according to experimental examples 1-3 and comparative examples are shown in Table 2. It can be observed from Table 2 that the mechanical properties of the PET tableware article after the post-crystallization can be improved.

TABLE 1

|  | PET resin (wt %) | Barium sulfate (wt %) | Post-crystallization |
|---|---|---|---|
| Comparative example | 90 | 5 | none |
| Example 1 | 90 | 5 | Heated at 125° C. for 30 minutes |
| Example 2 | 90 | 5 | Heated at 150° C. for 30 minutes |
| Example 3 | 90 | 5 | Heated at 200° C. for 30 minutes |

TABLE 2

|  | Heat deformation temperature (HDT) | Scratch resistance | Ball pressure |
|---|---|---|---|
| Comparative example | 75° C. | 2N: no scratches<br>3N: very few scratches<br>5N: few scratches<br>6N: some scratches<br>7N: many scratches | 3.5 mm |
| Example 1 | 120° C. | 2N: no scratches<br>3N: no scratches<br>5N: no scratches<br>6N: no scratches<br>7N: no scratches | 2.0 mm |
| Example 2 | 148° C. | 2N: no scratches<br>3N: no scratches<br>5N: no scratches<br>6N: no scratches<br>7N: no scratches | 1.1 mm |
| Example 3 | 196° C. | 2N: no scratches<br>3N: no scratches<br>5N: no scratches<br>6N: no scratches<br>7N: no scratches | 1.1 mm |

In Table 2, the heat deformation temperature was measured in accordance with ASTM D648, under the condition that the test piece has a thickness of 3.18±0.13 mm and a load of 4.6 kg/cm². The scratch resistance test is conducted in the following manner. A test piece of 15 cm×15 cm was placed on the scratch testing device. Next, a round tungsten head is installed with load weight(s) to scratch the test piece according to testing requirements, wherein each test length is 10 cm. Then, observe whether the test piece has scratches or not.

One of the advantages of the present disclosure is that the method of the present disclosure can improve the surface smoothness and temperature resistance of the tableware article by including steps of: granulating a specific PET resin composition to obtain plastic granules and molding the plastic granules into a tableware article, and subsequently post-crystallizing the tableware article. Therefore, a high-quality thermal transfer printed pattern, which is complete and clear, can be formed on the tableware article.

Furthermore, PET tableware article (e.g., bowl or dish) manufactured by the method of the present disclosure can have a ceramic-like glossy appearance and do not release toxic substances during use. Such PET tableware article takes aesthetics and food safety into consideration, so that the PET tableware article can be in place of melamine tableware commonly used by the public.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for manufacturing a tableware article having a thermal-transfer printed pattern, comprising:
   providing a PET resin composition including 3 to 5% by weight of an inorganic filler;
   granulating the PET resin composition to obtain plastic granules;
   molding the plastic granules into the tableware article and post-crystallizing the tableware article after the molding of the tableware article is completed, wherein in the step of post-crystallizing the tableware article, the tableware article is subjected to a heat treatment for a period of time between 10 minutes and 30 minutes at 200° C.; and
   forming a thermal transfer printed pattern on a surface of the post-crystallized tableware article, wherein the heat treatment temperature is higher than a temperature for forming the thermal transfer printed pattern.

2. The method according to claim 1, wherein the inorganic filler is barium sulfate.

3. The method according to claim 1, wherein in the step of granulating the PET resin composition, the PET resin composition is added to a twin-screw extruder and melted at a temperature between 250° C. and 280° C. for granulation.

4. The method according to claim 1, wherein in the step of forming the thermal transfer printed pattern, the tableware article is subjected to thermal transfer under a vacuum environment with a pressure between 150 torr and 760 torr.

5. The method according to claim 1, wherein the PET resin composition further includes 1 to 10% by weight of at least one additive selected from one or a combination of two of a lubricant, an antioxidant, a stabilizer, and a coloring agent.

* * * * *